Patented Apr. 17, 1923.

1,451,711

UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

VULCANIZED-RUBBER SOLUTION AND PROCESS OF PRODUCING IT.

No Drawing. Application filed May 25, 1918, Serial No. 236,462. Renewed September 19, 1922. Serial No. 589,198.

*To all whom it may concern:*

Be it known that I, WILLIAM BEACH PRATT, a citizen of the United States, residing at Wellesley, in the county of Norfolk and State of Massachusetts, have invented new and useful Improvements in Vulcanized-Rubber Solutions and Processes of Producing Them, of which the following is a specification.

This invention has for its object to provide a commercial vulcanized-rubber solution.

In accordance with the invention, I mix crude rubber, sulphur and the solvent in any desired proportions, and digest the mixture with heat and stirring until the product consists of a solution of vulcanized rubber. When the solution is thus effected, the product may be passed through parchment, being diluted, of course, if necessary because of its consistency.

As the solvent I may use certain commercial terpenes, or substances containing terpenes, e. g. oil or spirits of turpentine or its equivalent, which has been subjected to a preliminary treatment to produce heavy volatile oils capable of dissolving both rubber and sulphur. For example, by digesting commercial oil of turpentine with commercial hydrated oxalic acid at atmospheric pressure or above at an elevated temperature, a product is produced after separating the acid, consisting of a mixture of light and heavy oils, which may be separately recovered on subjecting the said product to fractional distillation. The heavy oils, boiling at 202° C. and above are highly efficient in dissolving sulphur, rubber and vulcanized rubber including ebonite, and may be diluted with certain of the light oils boiling at a temperature below 202° C.

For producing a solvent, suitable for carrying out the process and producing the product, I have proceeded as follows:— Spirits or oil of turpentine, or its equivalent, is throughly mixed with commercial hydrated oxalic acid (say 2.5%–10% by weight), and the mixture is digested at atmospheric pressure, or above, at a temperature of not less than approximately 140°–163° C.; after which the mixture is cooled until the oxalic acid is crystallized out, and is preferably washed to remove all acid therefrom. This product now may be used in accordance with the present process in preparing a vulcanized rubber solution, but, if desired, it may be first subjected to fractional distillation to distill off the light oils, which boil below 202° C., leaving a residuum of heavy oils analogous to those of the eucalyptus and camphor series, which has intensive qualities as a solvent for rubber, sulphur and vulcanized rubber. Those distillates, having boiling points of 130°–178° C. (especially those which boil at 174°–178° C.) may be separately recovered since they are of value for thining or diluting either the rubber solution or the heavy oil solvent.

In practicing the process of producing a vulcanized rubber solution, one proceeds as follows: To any desired quantity of crude rubber, 5%–40% by weight of flour of sulphur is added together with sufficient solvent to form a product of the desired consistency, and the mixture is digested, with constant stirring, and heat,—say 140°–200°C.,—until the solution is effected. Since the digestion is effected at a temperature at which rubber is vulcanized, and the same proportions of rubber and sulphur are employed as in vulcanization, the rubber is vulcanized and a solution thereof produced. Of course the proportion of the sulphur may be varied, just as it may be varied in the usual process of vulcanization, so that, after the solvent of the solution has been volatilized, the solid product will have the desired characteristics. The consistency of the solution varies with the proportion of the solvent employed. When the heavy oils only are used, the solution may be thinned by the lighter oils which boil below 202° C. In making the solution, the crude rubber may be in the form of sheets, lumps, etc., as most convenient. A solution, as herein described, when sufficiently dilute will pass through parchment, and will be preferably filtered to ensure the removal of any foreign bodies that may have been in the crude rubber. It may be colored by aniline coloring matter or by suitable pigments. When pigments are used, they are preferably mixed with the solution after the filtration has occurred, in case the mass is filtered; otherwise the color-imparting matter may be added at any time during the process of producing the solution.

To prevent the volatilization of the product before it has been used, it should be kept in an air-tight container.

The solution may be put to many uses technologically or industrially, and may be applied by a brush or a pallet knife or by a spraying nozzle. On being subjected to heat, the volatile solvent is driven off leaving behind vulcanized rubber. If the vulcanization of the rubber in the digestion of the sulphur and rubber with the solvent is incomplete for any cause, e. g. in sufficient time or temperature, the vulcanization of the rubber may be completed by the application of heat at a vulcanizing temperature, when volatilizing the solvent after the application of the solution to the desired article.

I do not herein claim the herein-described process of treating terpene-containing substances with oxalic acid and subjecting the resultant product to fractional distillation, as it forms the subject of an application Serial No. 229,925, filed April 22, 1918; or an ebonite solution or solvent of ebonite as they form the subject of an application Serial No. 233,855, filed May 11, 1918, but

What I claim is:

1. A process of making a solution capable of passing through parchment which consists in digesting a mixture of crude rubber and sulphur and a solvent thereof at an elevated temperature.

2. A process of making a solution capable of passing through parchment which consists in digesting at an elevated temperature crude rubber, sulphur and a product obtained from terpenes or a terpene-containing substance.

3. A process of making a liquid solution which consists in digesting, at an elevated temperature, crude rubber, sulphur, and a product obtained by digesting a terpene-containing substance with oxalic acid.

4. A process of making a liquid solution which consists in digesting, at an elevated temperature, crude rubber, sulphur, and the residuum resulting from distilling off the light oils of spirits of turpentine previously digested with oxalic acid.

5. A liquid solution consisting of vulcanized rubber and a solvent produced by the digesting of spirits of turpentine with oxalic acid.

6. A liquid solution of vulcanized rubber comprising sulphur, rubber, and a residuum resulting from the distillation from oxalic-acid-treated spirits of turpentine of those oils having a boiling point of less than 202° C.

7. The herein-described process which consists in vulcanizing rubber and sulphur at a vulcanizing temperature in the presence of a solvent and thereby producing a solution of vulcanized rubber capable of passing through parchment.

In testimony whereof I have affixed my signature.

WILLIAM BEACH PRATT.